The

(12) United States Patent
Lee (10) Patent No.: US 9,089,219 B2
(45) Date of Patent: Jul. 28, 2015

(54) FOOTREST FOR CAR SEAT

(71) Applicant: Myungjoo Lee, Seoul (KR)

(72) Inventor: Myungjoo Lee, Seoul (KR)

( * ) Notice: Subject to any disclaimer, the term of this patent is extended or adjusted under 35 U.S.C. 154(b) by 0 days.

(21) Appl. No.: 14/478,526

(22) Filed: Sep. 5, 2014

(65) Prior Publication Data

US 2015/0115685 A1    Apr. 30, 2015

(30) Foreign Application Priority Data

Oct. 31, 2013  (KR) ......................... 10-2013-0130822

(51) Int. Cl.
    *A47C 7/16*   (2006.01)
    *A47C 7/52*   (2006.01)
    *A47C 7/50*   (2006.01)
    *A47D 15/00*  (2006.01)

(52) U.S. Cl.
    CPC . *A47C 7/52* (2013.01); *A47C 7/506* (2013.01); *A47D 15/00* (2013.01)

(58) Field of Classification Search
    CPC ........... A47C 7/52; A47C 7/506; A47D 15/00
    USPC ................... 297/423.4, 219.1, 219.12, 423.39
    See application file for complete search history.

(56) References Cited

U.S. PATENT DOCUMENTS

| | | | | |
|---|---|---|---|---|
| 1,688,225 | A * | 10/1928 | Belohlavek | 297/423.3 X |
| 2,119,023 | A * | 5/1938 | Pickard | 297/253 |
| 2,546,871 | A * | 3/1951 | Schley | 297/423.38 |
| 2,663,359 | A * | 12/1953 | Wood | 297/253 |
| 2,731,072 | A * | 1/1956 | Post | 297/6 |
| 4,874,203 | A * | 10/1989 | Henley | 297/250.1 |
| 5,111,909 | A * | 5/1992 | Liu | 182/150 |
| 5,228,745 | A * | 7/1993 | Hazel | 297/219.12 X |
| D342,405 | S * | 12/1993 | Hazel | D6/501 |
| 5,549,353 | A * | 8/1996 | Gaudet et al. | 297/219.12 X |
| 6,237,996 | B1 * | 5/2001 | Chen et al. | 297/130 |
| 6,561,588 | B1 * | 5/2003 | Brady | 297/423.4 |
| 6,796,606 | B2 * | 9/2004 | Marshall | 297/219.12 X |
| 6,860,557 | B2 * | 3/2005 | Jonasson | 297/423.4 X |
| 7,364,213 | B2 * | 4/2008 | Romolo | 296/68.1 |
| 7,448,688 | B2 * | 11/2008 | Farah | 297/423.39 |
| 7,753,445 | B2 * | 7/2010 | Kassai et al. | 297/256.16 |
| 7,967,387 | B2 * | 6/2011 | Langhorn | 297/423.4 |
| 8,757,723 | B1 * | 6/2014 | Faust | 297/423.4 X |
| 2003/0205921 | A1 * | 11/2003 | McConnell et al. | 297/256.16 |

FOREIGN PATENT DOCUMENTS

| | | |
|---|---|---|
| JP | 2001-239868 | 9/2001 |
| JP | 2002-052963 | 2/2002 |
| KR | 20-0295622 | 11/2002 |

* cited by examiner

*Primary Examiner* — Rodney B White (74) *Attorney, Agent, or Firm* — Lexyoume IP Meister, PLLC (57) ABSTRACT

A footrest for a car seat is disclosed. The footrest includes a coupling plate including at least one first coupling hole formed in a surface of the coupling plate, a supporting plate including at least one second coupling hole formed in a surface of the supporting plate, and at least one guide bar having a column shape and detachably coupled into the first coupling hole and the second coupling hole. Through combination of these configurations, feet of all age groups of children sitting on the car seat are comfortably and safely supported by adjusting the height and inclination of the supporting plate, and the footrest is simply and easily installed and fixed and is used for all types of car seats.

8 Claims, 9 Drawing Sheets

FOOTREST FOR CAR SEAT

CROSS-REFERENCE TO RELATED PATENT APPLICATION

This application claims the benefit of Korean Patent Application No. 10-2013-0130822, filed on Oct. 31, 2013, in the Korean Intellectual Property Office, the disclosure of which is incorporated herein in its entirety by reference.

BACKGROUND OF THE INVENTION

1. Field of the Invention

The present invention relates to a footrest for a car seat, and more particularly, to a footrest for a car seat that may support a child (a newborn baby, a toddler, or a child) who sits on a car seat to provide comfortability and safety and may be simply installed.

2. Description of the Related Art

In general, a vehicle includes seat belts in order to ensure safety of passengers as well as a driver, and predetermined weight and height or more of children or adults fasten a seat belt so as to prevent their bodies from being catapulted out of the car. However, since children such as a newborn baby, a toddler, or a child, the body of which is smaller than an adult cannot tightly wear a seat belt, even if the children wear a seat belt, the children are in danger of being catapulted out of the car on impact. In order to prevent this problem, a car seat (or child seat) according to a child size is mounted on a vehicle seat, the child sits on the car seat, and then the child wears a seat belt so as to ensure the safety of the child.

However, the feet of the child who sits on the car seat do not touch the bottom of vehicle such that the feet are spaced apart from the bottom of the car seat. In this state, when the vehicle is moved for a long period of time or frequently, a problem arises in that the child goes through inconvenience, the knee, the ankle, or the like is also likely to be damaged, and the child is seriously hurt than an adult while an accident occurs.

In order to overcome this problem, Korean Patent No. 10-0331007 discloses a car seat with a footrest installed therein. However, in this Korean Patent, since the footrest is installed in the car seat, it is inconvenient to abandon a previously used car seat and to purchase a new car seat. In addition, the height and inclination of the footrest are not adjusted according to the body type of a child and the footrest is always fixed. Accordingly, a problem arises in that all age groups of children cannot use the car seat.

SUMMARY OF THE INVENTION

The present invention provides a footrest for a car seat that may be simply installed in all types of car seats and may adjust the height or inclination of the footrest according to a body size of a child.

According to an aspect of the present invention, there is provided a footrest for a car seat including a coupling plate having a plate shape so as to be coupled between a vehicle seat and a car seat coupled thereto and including at least one first coupling hole formed on a surface of the coupling plate, a supporting plate having a plate shape so as to support feet of a child sitting on the car seat and including at least one second coupling hole on a surface of the supporting plate, and at least one guide bar having a column shape and detachably coupled into the first coupling hole and the second coupling hole, wherein the first coupling hole and the second coupling hole are each a through hole, and an upper end of a guide bar coupled into the first coupling hole is inserted into the second coupling hole so as to position the supporting plate above the coupling plate or a lower end of the guide bar coupled into the first coupling hole is inserted into the second coupling hole so as to position the supporting plate below the coupling plate.

The supporting plate may be rotatable and is fixedly coupled at a specific location of the guide bar while inclination of the supporting plate is adjusted.

The supporting plate may include a supporting member having a plate shape so as to support feet of the child sitting on the car seat, a fixing member including the at least one second coupling hole and coupled to the at least one guide bar, and an inclination adjuster rotatably coupling the supporting member in an axis direction of the fixing member.

The inclination adjuster may include an inclination adjusting gear coupled to a first coupling groove formed in each external side of the fixing member or a second coupling groove formed in each internal side of the supporting member, and an inclination adjusting switch elastically coupled to the inclination adjusting gear and controlling the inclination adjusting gear to be inserted into or separated from the second coupling groove, wherein the inclination adjusting gear is separated from the second coupling groove so as to adjust inclination of the supporting member when a pressure is applied to the inclination adjusting switch, and is coupled into the second coupling groove according to restoration force so as to fix the supporting member when the pressure applied to the inclination adjusting switch is removed.

The footrest may further include a first location adjuster for fixing the supporting plate to the guide bar while the guide bar is inserted into the first coupling hole and a coupling location of the supporting plate and the guide bar is adjusted, and a second location adjuster for fixing the supporting plate to the guide bar while the guide bar is inserted into the second coupling hole and a coupling location of the supporting plate and the guide bar is adjusted.

The at least one guide bar may include a plurality of holes formed in an outer circumference surface with a column shape, the second location adjuster may include at least one supporting plate fixedly coupled to a frame, at least one location adjuster elastically coupled to the supporting plate and including a protrusion formed at one end and inserted into or separated from a hole of the guide bar, a finger stop formed at the other end, and a handle protruding from an upper end or lower end of the frame, and a controller including a flange on which the finger stop stumbles and a switch protruding from an upper end or lower end of the frame, elastically coupled to the frame in the frame, moving along an outer circumference surface of the supporting plate, the finger stop may stumble on the flange and the location adjuster is fixed while the protrusion is separated from a hole of the guide bar when the handle is moved in a direction toward the supporting plate, and the finger stop may be separated from the flange, the protrusion is inserted into the hole of the guide bar, and the guide bar and the supporting plate are fixedly coupled when a pressure is applied in a direction that is not parallel to a moving direction of the handle.

The at least one guide bar may include a plurality of holes formed in the outer circumference surface with a column shape, and the first location adjuster may include an insertion portion extending in one direction or two opposite directions from the first coupling hole, and including a hollow formed in the insertion portion so as to insert the guide bar into the insertion portion and at least one through hole in an outer circumference surface of the insertion portion; and a coupling portion inserted into a through hole of the insertion portion and the hole of the guide bar so as to fixedly fix the guide bar and the coupling plate while the guide bar is inserted into the insertion portion.

The at least one first coupling hole and the second coupling hole are each a through hole, and the coupling plate and the guide bar may be fixedly coupled while the guide bar is press-fit into the first coupling hole and a coupling location of the coupling plate and the guide bar is adjusted, and the supporting plate and the guide bar may be fixedly coupled while the guide bar is press-fit into the second coupling hole and a coupling location of the supporting plate and the guide bar is adjusted.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

Figure 1:
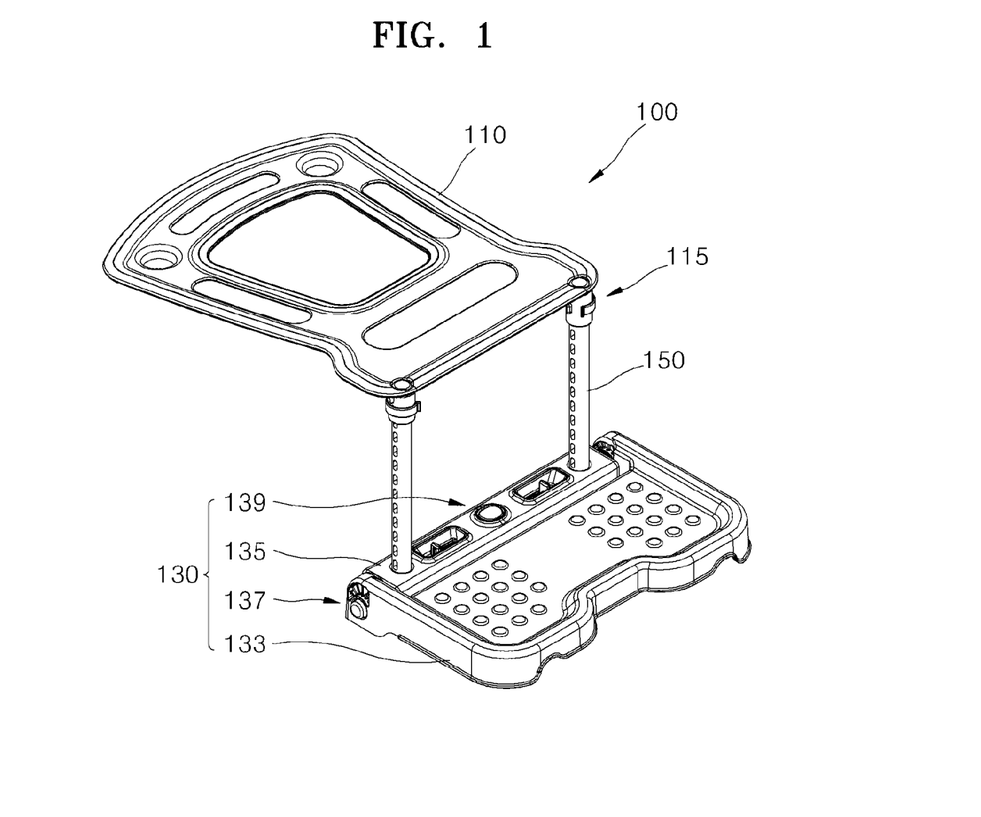
FIG. 1 is a perspective view of a car seat footrest according to an embodiment of the present invention.
Figure 2:
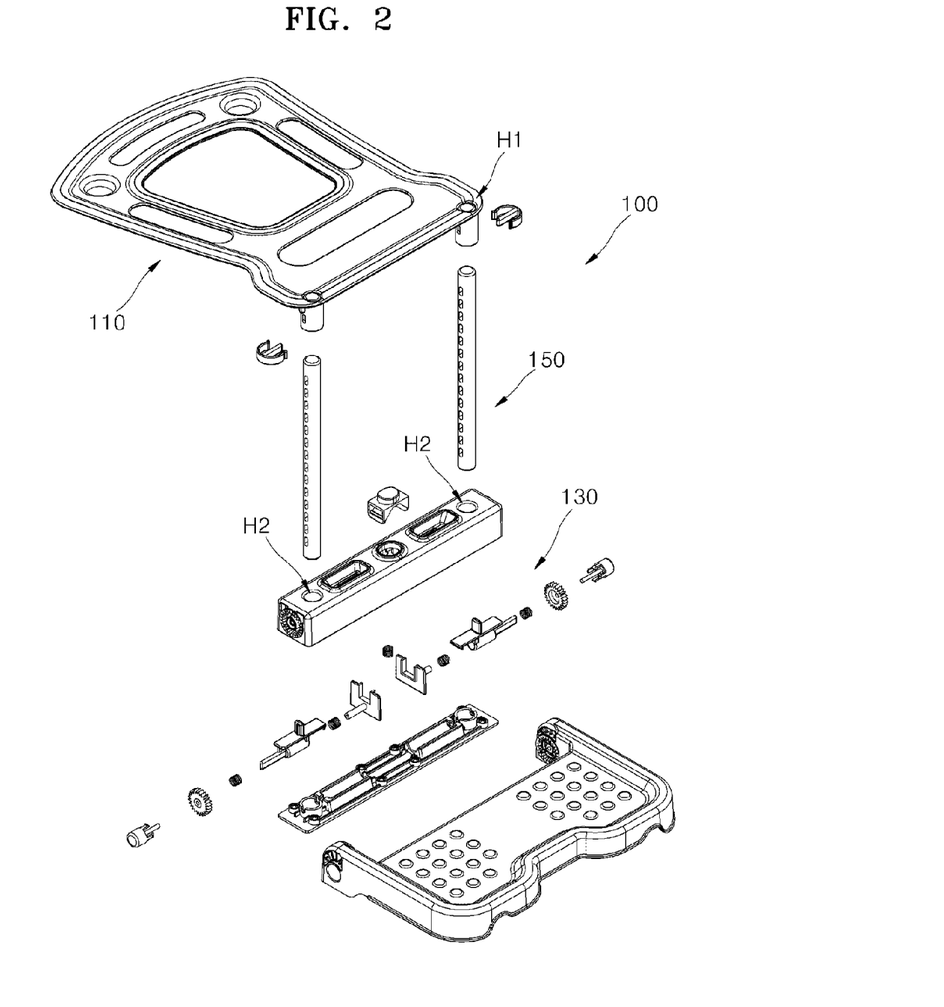
FIG. 2 is an exploded perspective view of the car seat footrest of FIG. 1.

FIG. 1 is a perspective view of a car seat footrest 100 according to an embodiment of the present invention. FIG. 2 is an exploded perspective view of the car seat footrest 100 of FIG. 1.

Referring to FIGS. 1 and 2, the car seat footrest 100 may include a coupling plate 110, a supporting plate 130, and at least one guide bar 150.

The coupling plate 110 may have a plate shape so as to be coupled between a vehicle seat and a car seat coupled thereto and include at least one first coupling hole H1 formed on a surface of the coupling plate 110. In general, in order to install a carseat on a vehicle seat, the car seat may be positioned and the car seat may be tied by a seat belt of the vehicle so as to be fixed to the vehicle. Likewise, when the car seat is positioned on the vehicle seat, the coupling plate 110 may be positioned between the vehicle seat and the car seat to be fixed. That is, when the coupling plate 110 may be positioned on the vehicle seat, the car seat may be positioned on the coupling plate 110, and then the car seat is tied by the seat belt so as to be fixed, a pressure of the car seat toward the vehicle seat may be propagated to the coupling plate 110 and the car seat footrest 100 may be fixed. The coupling plate 110 may be formed with various shapes and various materials and may not be limited to the shape of FIGS. 1 and 2 as long as the coupling plate 110 is fixedly coupled between the car seat and the vehicle seat.

The supporting plate 130 may have a plate shape so as to support the feet of a child who sits on the car seat and include at least one second coupling hole H2 on a surface of the supporting plate 130. The supporting plate 130 may be a portion for supporting the feet of the child who sits on the car seat, may be formed with various shapes and various materials, and may not be limited to the shape of FIGS. 1 and 2.

The guide bar 150 may have a column shape and may be detachably coupled into the first coupling hole H1 and the second coupling hole H2. FIG. 1 illustrates the embodiment in which an upper end portion of the guide bar 150 is fixedly inserted into the first coupling hole H1 formed in the coupling plate 110 and a lower end portion of the guide bar 150 is fixedly inserted into the second coupling hole H2 formed in the supporting plate 130. However, the present invention is not limited thereto. The guide bar 150 may be inserted into or separated from the first coupling hole H1 and the second coupling hole H2. Accordingly, oppositely to the embodiment of FIG. 1, a lower end portion of the guide bar 150 is fixedly inserted into the first coupling hole H1 and an upper end portion of the guide bar 150 is fixedly inserted into the second coupling hole H2 so as to position the supporting plate 130 above the coupling plate 110 (refer to FIG. 10). FIGS. 1 and 2 illustrate the embodiment in which two guide bars 150 are inserted into the first coupling hole H1 and the second coupling hole H2 that respectively correspond thereto. However, the present invention is not limited thereto. A different number of guide bars 150 may be fixedly inserted into the first coupling hole H1 and the second coupling hole H2. Accordingly, the number of first coupling holes H1 and the number of second coupling holes H2 may be greater than at least the number of the guide bars 150.

Since the supporting plate 130 may be rotatable, the supporting plate 130 with adjusted inclination may be fixedly coupled to the guide bar 150. The inclination of the supporting plate 130 may be adjusted for comfortability of the child who sits on the car seat or according to convenience of the child such that the child may comfortably and safely sit on the car seat. The supporting plate 130 may include a supporting member 133, a fixing member 135, and an inclination adjuster 137 as an embodiment of components for adjusting the inclination of the supporting plate 130, which will be described in more detail with reference to FIGS. 3 and 4.

In addition, the coupling plate 110 or the supporting plate 130 may be fixedly coupled at a specific location or specific height of the guide bar 150. That is, the first coupling hole H1 and the second coupling hole H2 are each formed as a through hole, and the guide bar 150 is inserted into the first coupling hole H1 or the second coupling hole H2 up to a specific location of the guide bar 150 so as to fixedly couple the coupling plate 110 or the supporting plate 130 and the guide bar 150. Thus, a location or height of the guide bar 150 at which the coupling plate 110 or the supporting plate 130 is coupled to the guide bar 150 may be adjusted. The car seat footrest 100 may further include a first location adjuster 115 and a second location adjuster 139 as components for adjusting a coupling location of the coupling plate 110 or the supporting plate 130. The second location adjuster 139 may fix the supporting plate 130 to the guide bar 150 while the guide bar 150 is inserted into the second coupling hole H2 and a coupling location of the supporting plate 130 and the guide bar 150 is adjusted. An embodiment of the first location adjuster 115 and the second location adjuster 139 will be described in more detail with reference to FIGS. 5 and 6.

Figure 3:
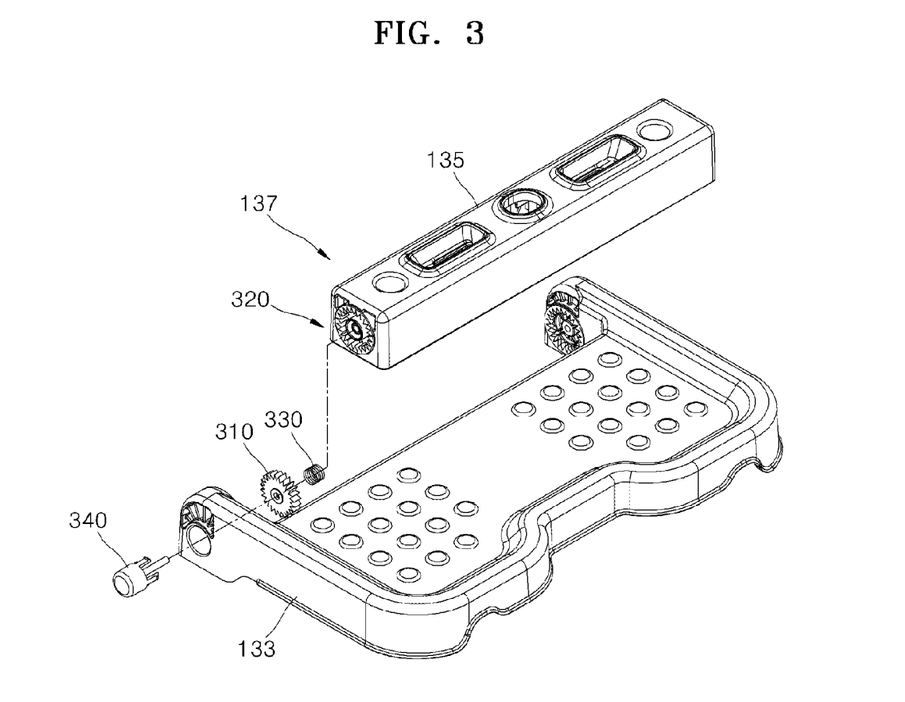
FIG. 3 is a view of an inclination adjuster for adjusting inclination of the supporting plate of FIG. 1.
Figure 4:
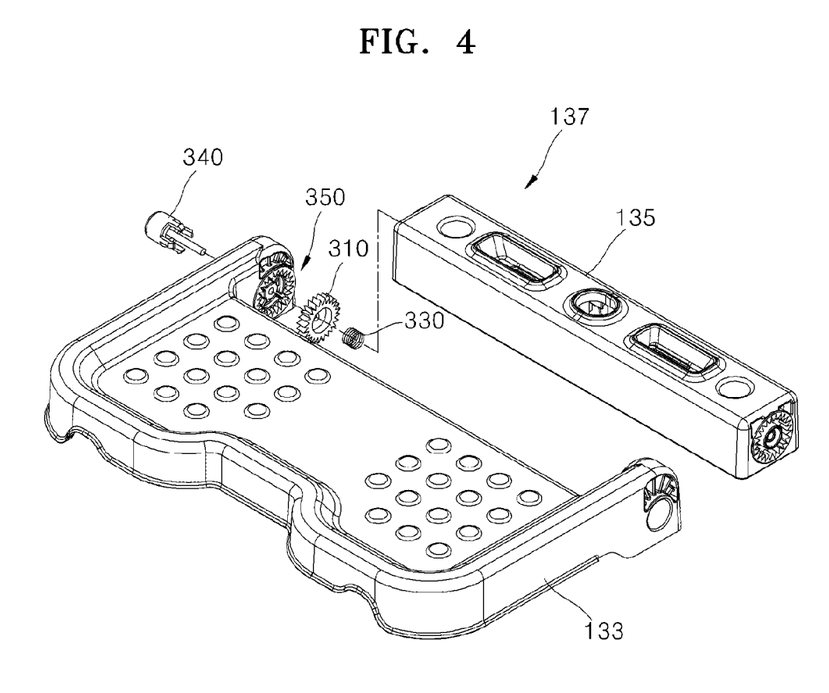
FIG. 4 is a view of an inclination adjuster viewed from a different direction from in FIG. 3.

FIG. 3 is a view of the inclination adjuster 137 for adjusting inclination of the supporting plate 130 of FIG. 1, and FIG. 4 is a view of the inclination adjuster 137 viewed from a different direction from in FIG. 3.

Referring to FIGS. 1 to 4, the supporting plate 130 may include the supporting member 133, the fixing member 135, and the inclination adjuster 137.

The supporting member 133 may have a plate shape so as to support the feet of a child who sits on the car seat. The fixing member 135 may include at least one second coupling hole H2 formed therein and may be coupled to at least one guide bar 150. The inclination adjuster 137 may rotatably couple the supporting member 133 in an axis direction of the fixing member 135. The inclination adjuster 137 may couple the supporting member 133 and the fixing member 135 using various configurations. Among these, one embodiment according to the present invention will be described with reference to FIGS. 3 and 4.

The inclination adjuster 137 may include an inclination adjusting gear 310 and an inclination adjusting switch 340. The inclination adjusting gear 310 may be coupled to a first coupling groove 320 formed in each external side of the fixing member 135 or a second coupling groove 350 formed in each internal side of the supporting member 133. The inclination adjusting gear 310 may be saw-toothed like in the embodiment illustrated in FIGS. 3 and 4. However, the present invention is not limited thereto, and the inclination adjusting gear 310 may have other shapes. The first coupling groove 320 or the second coupling groove 350 may have the same shape as that of the inclination adjusting gear 310.

The inclination adjusting switch 340 may be elastically coupled to the inclination adjusting gear 310 and may control the inclination adjusting gear 310 to be inserted into or separated from the second coupling groove 350. In order to elastically couple the inclination adjusting switch 340 and the inclination adjusting gear 310, an elastic body 330 may be coupled between the inclination adjusting gear 310 and the fixing member 135.

For example, when a pressure is applied to the inclination adjusting switch 340 (when a force is applied in a direction toward the fixing member 135 from the supporting member 133 in the embodiment of FIGS. 3 and 4), the inclination adjusting gear 310 may be separated from the second coupling groove 350. That is, when the inclination adjusting gear 310 is separated from the second coupling groove 350, the supporting member 133 may be freely rotatable, and thus, a user may adjust the supporting member 133 to be positioned at desired inclination.

When the inclination of the supporting member 133 is adjusted and then the pressure applied to the inclination adjusting switch 340 is removed (when the force applied in the direction toward the fixing member 135 from the supporting member 133 is removed in the embodiment of FIGS. 3 and 4), the inclination adjusting gear 310 may be coupled to the second coupling groove 350 according to restoration force. That is, when the inclination adjusting gear 310 is coupled to the second coupling groove 350 according to the restoration force of the elastic body 330, the supporting member 133 is fixed, and thus the user may fix and use the supporting member 133 that is adjusted with desired inclination. For example, when the inclination adjusting gear 310 is saw-toothed, as the number of saw teeth increases, the inclination of the supporting member 133 may be adjusted in more detail.

The inclination adjuster 137 of the car seat footrest 100 according to an embodiment of the present invention may not be limited to the embodiment of FIGS. 3 and 4 and may have various different structures as long as the inclination adjuster 137 adjusts and fixes the inclination of the supporting member 133.

Figure 5:
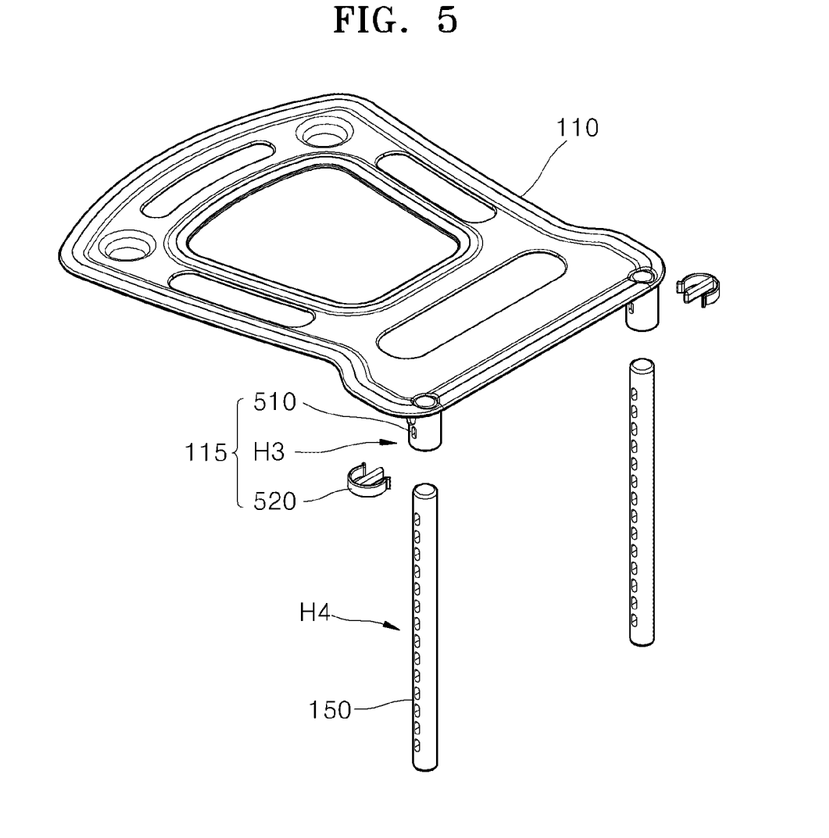
FIG. 5 is a view of a first location adjuster illustrated in FIG. 1 according to an embodiment of the present invention.

FIG. 5 is a view of the first location adjuster 115 illustrated in FIG. 1 according to an embodiment of the present invention.

Referring to FIGS. 1 to 5, the first location adjuster 115 may include an insertion portion 510 and a coupling portion 520 that are formed on the coupling plate 110.

The insertion portion 510 may extend in one direction or two opposite directions from the first coupling hole H1 formed in the coupling plate 110, include a hollow formed in the insertion portion 510 so as to insert the guide bar 150 into the insertion portion 510, and include at least one through hole H3 formed on an outer circumference surface of the insertion portion 510. That is, the insertion portion 510 may protrude to extend from the first coupling hole H1 in a direction toward the supporting plate 130 from the coupling plate 110. The guide bar 150 may include a plurality of holes H4 formed in an outer circumference surface with a column shape. In addition, the guide bar 150 and the coupling plate 110 may be fixedly coupled by inserting the coupling portion 520 into the hole H3 of the insertion portion 510 and the hole H4 of the guide bar 150 while the guide bar 150 is inserted into the insertion portion 510. That is, the first location adjuster 115 may adjust the location or height of the coupling plate 110 to fixedly couple the coupling plate 110 at a specific location of the guide bar 150.

The first location adjuster 115 of the car seat footrest 100 according to an embodiment of the present invention is not limited to the embodiment of FIG. 5 and may have various configurations as long as the first location adjuster 115 may adjust and fix the location or height of the coupling plate 110. For example, simply, the coupling plate 110 and the guide bar 150 may be fixedly coupled while the guide bar 150 is press-fit into the first coupling hole H1 and a coupling location of the coupling plate 110 and the guide bar 150 is adjusted. In this case, the hole H4 does not have to be formed in an outer circumference surface of the guide bar 150, and the first location adjuster 115 described with reference to FIG. 5 is not needed also.

Figure 6:
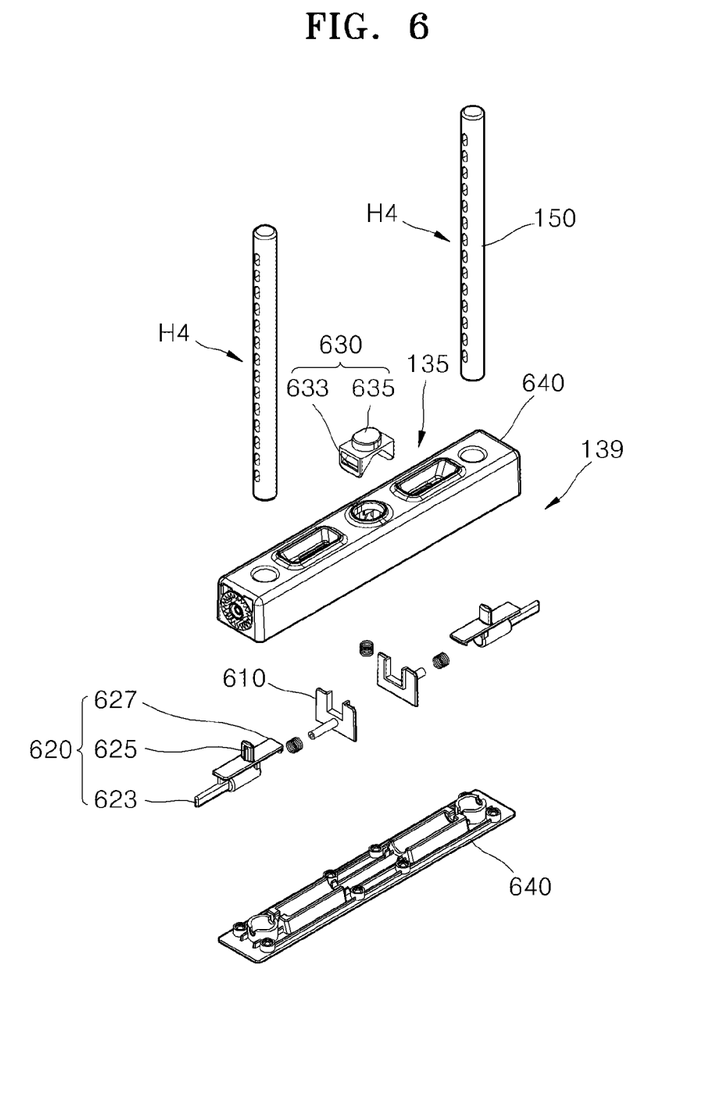
FIG. 6 is a view of a second location adjuster illustrated in FIG. 1 according to an embodiment of the present invention.

FIG. 6 is a view of the second location adjuster 139 illustrated in FIG. 1 according to an embodiment of the present invention.

Referring to FIGS. 1 to 6, the second location adjuster 139 may include at least one supporting plate 610, at least one location adjuster 620, a controller 630, and a frame 640 and may be formed on the fixing member 135 of the supporting plate 130.

The guide bar 150 may include a plurality of holes H4 formed on an outer circumference surface with a column shape. At least one supporting plate 610 may be fixedly coupled to the frame 640. Although FIG. 6 illustrates the case in which at least one supporting plate 610 is fixedly coupled to a bottom surface of the frame 640, the present invention is not limited thereto. Alternatively, the supporting plate 610 may be fixedly coupled to an internal side of a top surface of the frame 640. At least one location adjuster 620 may be elastically coupled to the supporting plate 610 and may include a protrusion 623 that is formed at one end and is inserted into or separated from the hole H4 of the guide bar 150, a finger stop 627 formed at the other end, and a handle 625 that protrudes from an upper end or lower end of the frame 640. In addition, the controller 630 may include a flange 633 on which the finger stop 627 stumbles and a switch 635 that protrudes from an upper end or lower end of the frame 640, may be elastically coupled to the frame 640 in the frame 640, and may move along an outer circumference surface of the supporting plate 610. For example, a guide groove may be formed in an outer circumference surface of the supporting plate 610, and the controller 630 may be moved along the guide groove.

For example, when the handle 625 is moved in a direction toward the supporting plate 610, the finger stop 627 may stumble on the flange 633 and the location adjuster 620 may be fixed while the protrusion 623 is separated from a hole of the guide bar 150. In this state, when a pressure is applied in a direction (a vertical direction of FIG. 6) that is not parallel to a moving direction of the handle 625, the finger stop 627 may be separated from the flange 633, and the protrusion 623 may be moved in a direction toward the guide bar 150 and inserted into the hole of the guide bar 150 according to restoration force of an elastic body, and thus the guide bar 150 and the supporting plate 130 may be fixedly coupled.

The second location adjuster 139 of the car seat footrest 100 according to an embodiment of the present invention is not limited to the embodiment of FIG. 6 and may have various different configurations as long as the second location adjuster 139 adjusts and fixes the location or height of the supporting plate 130. For example, simply, the supporting plate 130 and the guide bar 150 may be fixedly coupled while the guide bar 150 is press-fit into the second coupling hole H2 and a coupling location of the supporting plate 130 and the guide bar 150 is adjusted. In this case, the hole H4 does not have to be formed in an outer circumference surface of the guide bar 150, and the second location adjuster 139 described with reference to FIG. 6 is not needed also.

FIGS. 7 to 12 are views illustrating various states in which the car seat footrest 100 of FIG. 1 is used.

Figure 7:
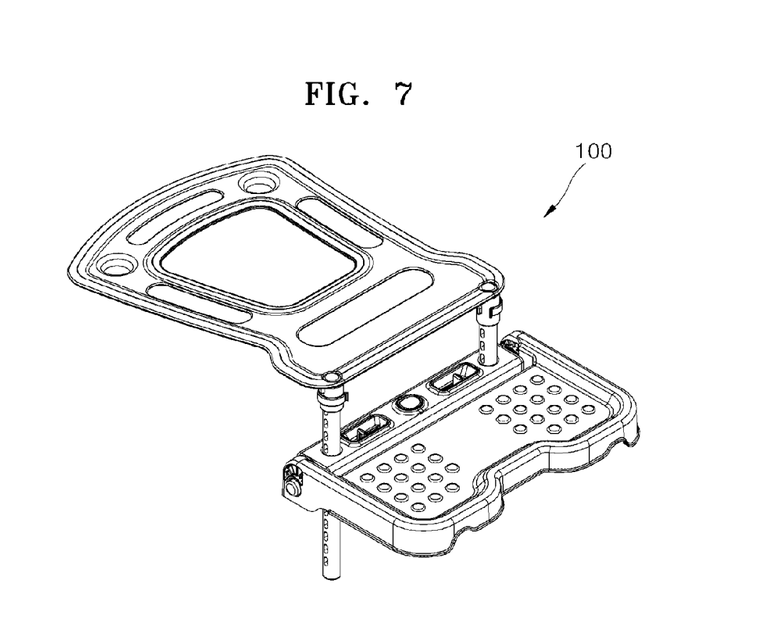
FIGS. 7 to 12 are views illustrating various states in which the car seat footrest of FIG. 1 is used.
Figure 8:
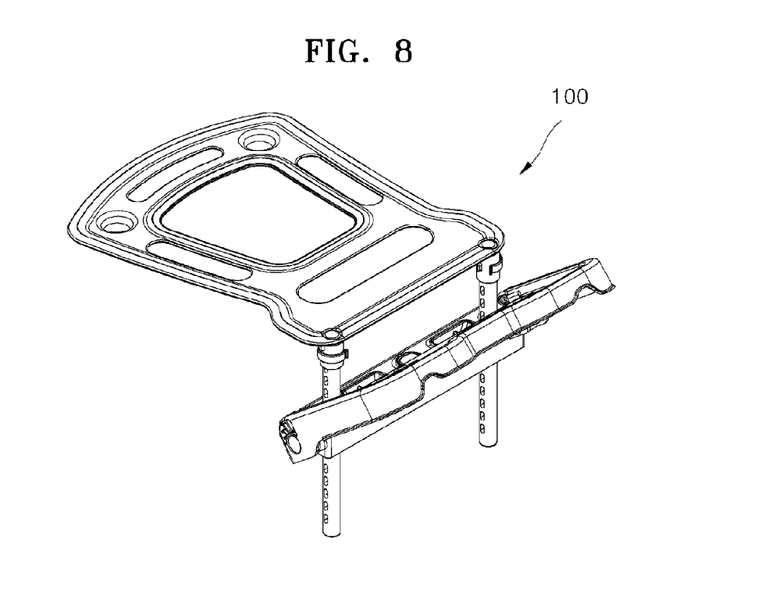
Figure 9:
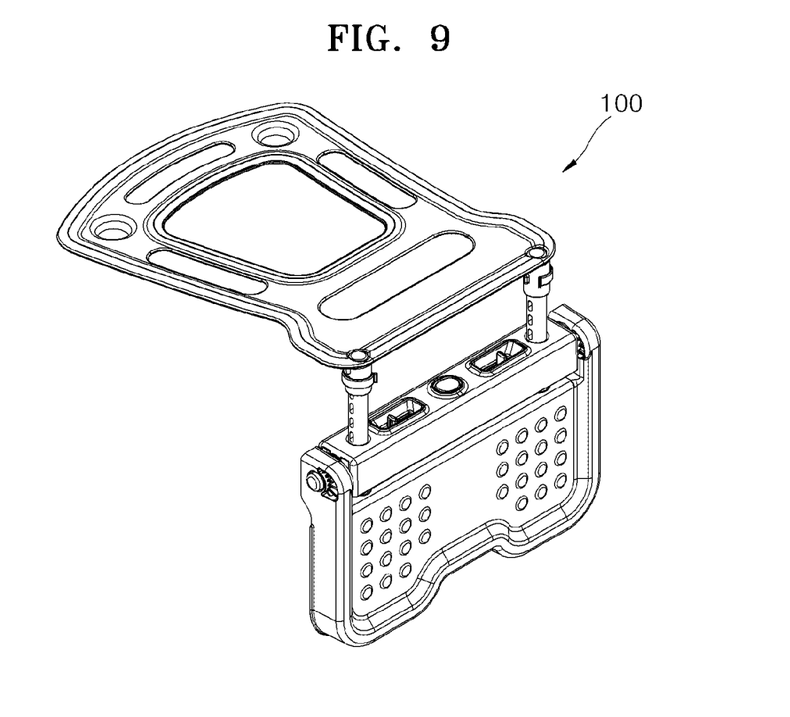

Referring to FIGS. 1 to 12, the car seat footrest 100 may be used while the location or height of the supporting plate 130 is adjusted like in an embodiment of FIG. 7 or while the inclination of the supporting plate 130 coupled to the same location as in FIG. 7 is adjusted like in an embodiment of FIG. 8 or 9. For example, when the car seat footrest 100 is coupled between a car seat and a vehicle seat, if child's feet do not have to be supported or a vehicle footing needs to be used, the supporting plate 130 may not be used like in FIG. 9.

Figure 10:
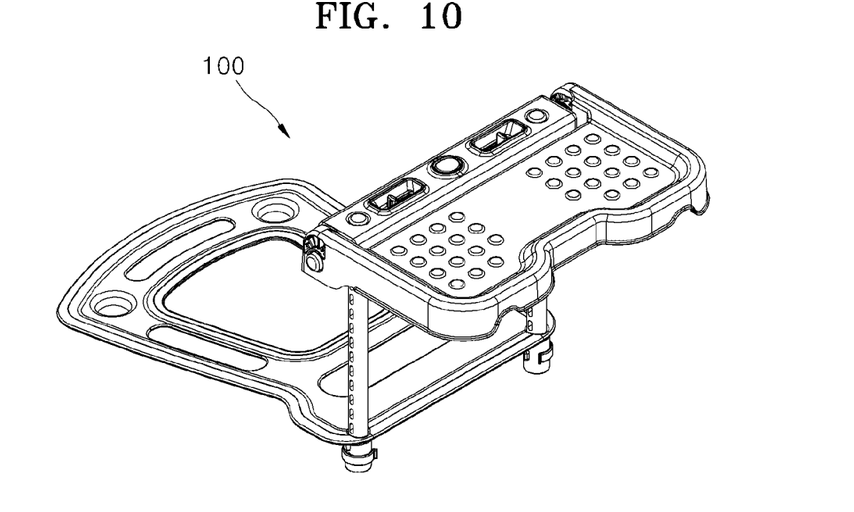
Figure 11:
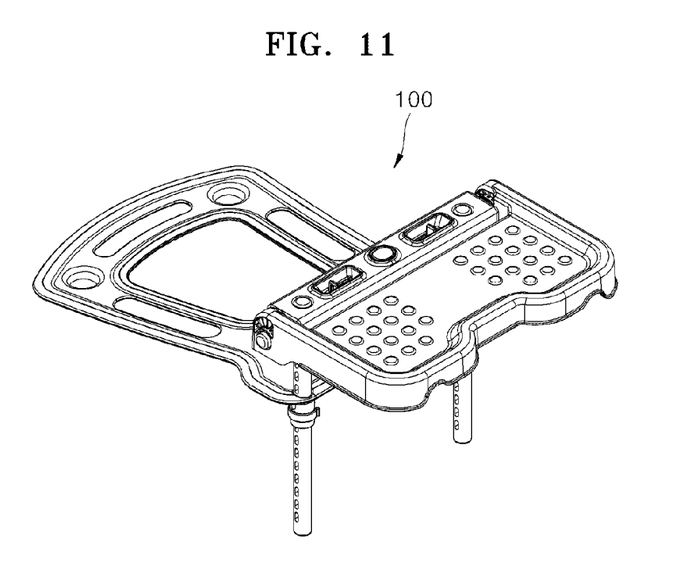
Figure 12:
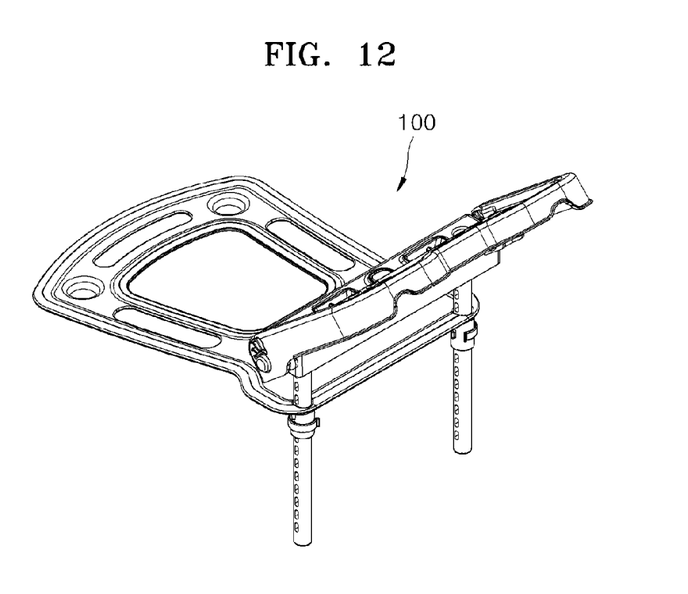

In addition, like in an embodiment of FIG. 10, the car seat footrest 100 may be coupled and used in an opposite way to the embodiment of FIG. 1. That is, as illustrated in FIG. 10, the coupling plate 110 and the supporting plate 130 may be coupled to the guide bar 150 so as to position the supporting plate 130 above the coupling plate 110. For example, when a child sitting on the car seat is small and his or her feet are positioned higher than the vehicle seat, the car seat footrest 100 may be used like in FIG. 10. FIG. 11 illustrates the state in which the location or height of the supporting plate 130 is adjusted based on the embodiment of FIG. 10, according to an embodiment of the present invention. FIG. 12 illustrates the state in which inclination of the supporting plate 130 coupled to the same location as in the embodiment of FIG. 11 is adjusted, according to an embodiment of the present invention.

In addition to the embodiments described with reference to FIGS. 7 to 12, the car seat footrest 100 according to an embodiment of the present invention may variously adjust locations of the supporting plate 130 and the coupling plate 110 and may also variously adjust inclination of the supporting plate 130. In addition, since the coupling plate 110 and the supporting plate 130 are detachable from the guide bar 150, when the car seat footrest 100 is not used, the car seat footrest 100 may occupy a small volume by separating the coupling plate 110, the supporting plate 130, and the guide bar 150 from each other so as to be easily and conveniently kept or carried.

According to an embodiment of the present invention, a footrest for a car seat is advantageous in that feet of all age groups of children sitting on the car seat may be comfortably and safely supported by simply adjusting the height or inclination of the footrest according to the body size of the child sitting on the car seat. In addition, instead of a footrest that is used only in a specific car seat or is installed in a car seat, a footrest for a car seat according to an embodiment of the present invention may be inserted between a vehicle seat and the car seat so as to be simply installed and fixed, and thus, is advantageous in that it is not necessary to purchase a new car seat and the footrest may be used for all types of car seats.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A footrest for a car seat, comprising:
   a coupling plate having a plate shape so as to be coupled between a vehicle seat and a car seat coupled thereto and comprising at least one first coupling hole formed on a surface of the coupling plate;
   a supporting plate having a plate shape so as to support feet of a child sitting on the car seat and comprising at least one second coupling hole on a surface of the supporting plate; and
   at least one guide bar having a column shape and detachably coupled into the first coupling hole and the second coupling hole,
   wherein:
   a pressure of the car seat toward the vehicle seat is propagated to the coupling plate to fix the footrest in place;
   the first coupling hole and the second coupling hole are each a through hole; and
   an upper end of a guide bar coupled into the first coupling hole is inserted into the second coupling hole so as to position the supporting plate above the coupling plate or a lower end of the guide bar coupled into the first coupling hole is inserted into the second coupling hole so as to position the supporting plate below the coupling plate.

2. The footrest according to claim 1, wherein the supporting plate is rotatable and is fixedly coupled at a specific location of the guide bar while inclination of the supporting plate is adjusted.

3. The footrest according to claim 2, wherein the supporting plate comprises:
   a supporting member having a plate shape so as to support feet of the child sitting on the car seat;
   a fixing member comprising the at least one second coupling hole and coupled to the at least one guide bar; and
   an inclination adjuster rotatably coupling the supporting member in an axis direction of the fixing member.

4. The footrest according to claim 3, wherein the inclination adjuster comprises:
   an inclination adjusting gear coupled to a first coupling groove formed in each external side of the fixing member or a second coupling groove formed in each internal side of the supporting member; and
   an inclination adjusting switch elastically coupled to the inclination adjusting gear and controlling the inclination adjusting gear to be inserted into or separated from the second coupling groove, wherein the inclination adjusting gear is separated from the second coupling groove so as to adjust inclination of the supporting member when a pressure is applied to the inclination adjusting switch, and is coupled into the second coupling groove according to restoration force so as to fix the supporting member when the pressure applied to the inclination adjusting switch is removed.

5. The footrest according to claim 1, further comprising:

a first location adjuster for fixing the supporting plate to the guide bar while the guide bar is inserted into the first coupling hole and a coupling location of the supporting plate and the guide bar is adjusted; and a second location adjuster for fixing the supporting plate to the guide bar while the guide bar is inserted into the second coupling hole and a coupling location of the supporting plate and the guide bar is adjusted.

6. The footrest according to claim 5, wherein the at least one guide bar comprises a plurality of holes formed in an outer circumference surface with a column shape;

wherein the second location adjuster comprises:

at least one supporting plate fixedly coupled to a frame;

at least one location adjuster elastically coupled to the supporting plate and comprising a protrusion formed at one end and inserted into or separated from a hole of the guide bar, a finger stop formed at the other end, and a handle protruding from an upper end or lower end of the frame; and a controller comprising a flange on which the finger stop stumbles and a switch protruding from an upper end or lower end of the frame, elastically coupled to the frame in the frame, moving along an outer circumference surface of the supporting plate;

wherein the finger stop stumbles on the flange and the location adjuster is fixed while the protrusion is separated from a hole of the guide bar when the handle is moved in a direction toward the supporting plate; and wherein the finger stop is separated from the flange, the protrusion is inserted into the hole of the guide bar, and the guide bar and the supporting plate are fixedly coupled when a pressure is applied in a direction that is not parallel to a moving direction of the handle.

7. The footrest according to claim 5, wherein the at least one guide bar comprises a plurality of holes formed in the outer circumference surface with a column shape; and wherein the first location adjuster comprises:

an insertion portion extending in one direction or two opposite directions from the first coupling hole, and comprising a hollow formed in the insertion portion so as to insert the guide bar into the insertion portion and at least one through hole in an outer circumference surface of the insertion portion; and a coupling portion inserted into a through hole of the insertion portion and the hole of the guide bar so as to fixedly fix the guide bar and the coupling plate while the guide bar is inserted into the insertion portion.

8. The footrest according to claim 1, wherein the coupling plate and the guide bar are fixedly coupled while the guide bar is press-fit into the first coupling hole and a coupling location of the coupling plate and the guide bar is adjusted, and the supporting plate and the guide bar are fixedly coupled while the guide bar is press-fit into the second coupling hole and a coupling location of the supporting plate and the guide bar is adjusted.

* * * * *